United States Patent
Martin-Cocher et al.

(10) Patent No.: US 6,557,899 B2
(45) Date of Patent: May 6, 2003

(54) RELEASABLE PLUG COUPLING WITH PROTECTIVE SLEEVE

(75) Inventors: Daniel Martin-Cocher, Grenoble (FR); Erminio Moretti, Grenoble (FR)

(73) Assignee: A. Raymond & Cie (FR)

( * ) Notice: Subject to any disclaimer, the term of this patent is extended or adjusted under 35 U.S.C. 154(b) by 0 days.

(21) Appl. No.: 10/158,662

(22) Filed: May 30, 2002

(65) Prior Publication Data
US 2002/0180210 A1 Dec. 5, 2002

(30) Foreign Application Priority Data
May 30, 2001 (DE) .......................... 101 26 205

(51) Int. Cl.⁷ .................... F16L 35/00; F16L 37/08
(52) U.S. Cl. .................. 285/81; 285/305; 285/308; 285/84
(58) Field of Search .................... 285/81, 84, 85, 285/305, 308, 316

(56) References Cited

U.S. PATENT DOCUMENTS

| | | | | | |
|---|---|---|---|---|---|
| 3,177,018 A | * | 4/1965 | Goodwin | .................... | 285/277 |
| 4,527,816 A | * | 7/1985 | Bresie et al. | .................. | 285/81 |
| 5,374,088 A | * | 12/1994 | Moretti et al. | ............... | 285/305 |
| 5,520,420 A | * | 5/1996 | Moretti | ......................... | 285/81 |
| 5,727,821 A | * | 3/1998 | Miller | ......................... | 285/318 |
| 5,934,709 A | * | 8/1999 | Morrison | ..................... | 285/39 |
| 6,065,779 A | * | 5/2000 | Moner et al. | .................. | 285/23 |
| 6,082,779 A | * | 7/2000 | Lesser et al. | .................. | 285/93 |
| 6,145,887 A | * | 11/2000 | Cambot-Courrau | ............ | 285/4 |
| 6,305,721 B1 | * | 10/2001 | Heinrichs et al. | ............. | 285/23 |
| 6,318,764 B1 | * | 11/2001 | Trede et al. | .................. | 285/305 |
| 6,343,814 B1 | | 5/2002 | Bucher et al. | ............... | 285/319 |

* cited by examiner

Primary Examiner—Eric K. Nicholson
(74) Attorney, Agent, or Firm—Gifford, Krass, Groh, Sprinkle, Anderson & Citkowski, P.C.

(57) ABSTRACT

The releasable plug coupling is used for connecting fluid lines, particularly, fuel lines of motor vehicles. The plug coupling comprises a tubular plug-in part (3) with an annular retaining lip (4) as well as a coupling housing (1) with a cylindrical receiving space (2) for inserting the plug-in part (3) and a separate retaining element (7) with elastic retaining edges (11) that project radially into the receiving space (2) and that grip behind the retaining lip (4) after the plug-in part (3) is inserted into the receiving space (2). The retaining edges (11) are attached to support bodies (12) that are connected at their ends by elastic connecting pieces (14) that form a V to pressure plates (15). These plates extend outwards through corresponding openings (16) in the housing wall (17) and are pressed together from the outside for releasing the coupling. On the head part (6) of the coupling housing (1) there is a protective sleeve (18) that can move axially and that covers the pressure plates (15) when the plug-in part (3) is inserted in order to prevent unintentional release of the coupling. This protective sleeve (18) is integrally connected by a radial connection ring (19) to an inner guidance sleeve (20) that, in turn, is connected at their free inner edge (21) by two opposing connecting pieces (22) to a ring (23). This has the effect that the retaining lip (4) pushes against the ring (23) when the plug-in part (3) is inserted and thus, the protective sleeve (18) is automatically moved by the retaining ring (4) over the pressure plate (15). Between the connection ring (19) and the front wall (25) of the housing head (6), there is a spiral spring (24) that keeps the protective sleeve (18) ready for movement.

9 Claims, 2 Drawing Sheets

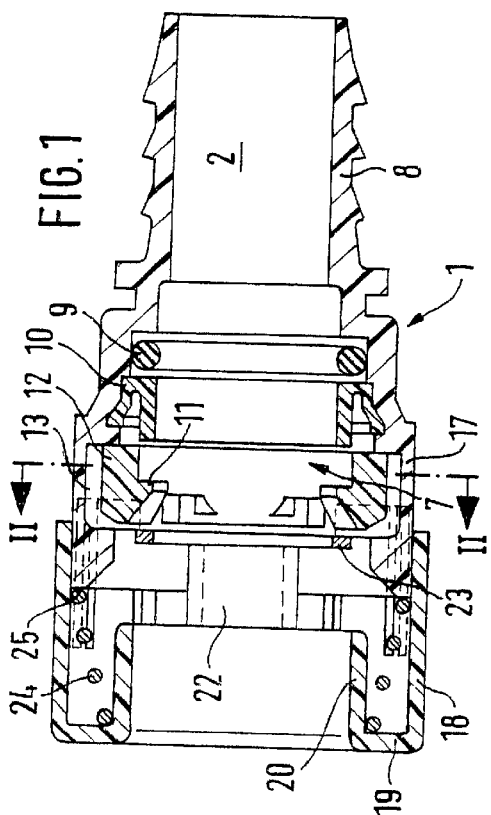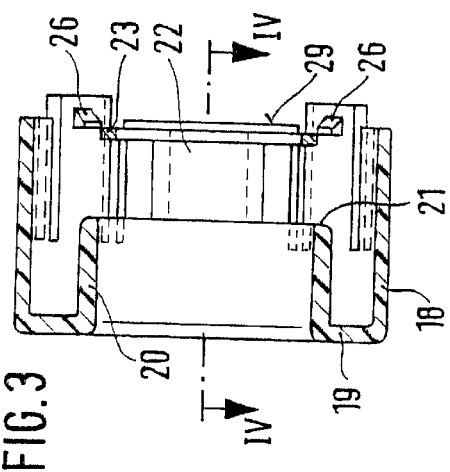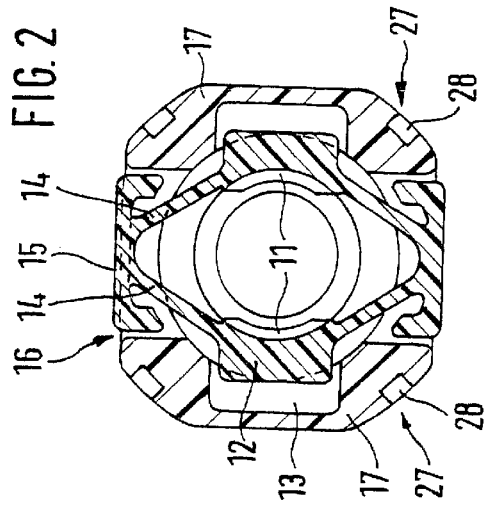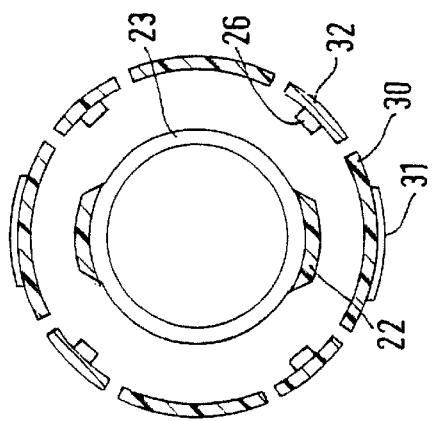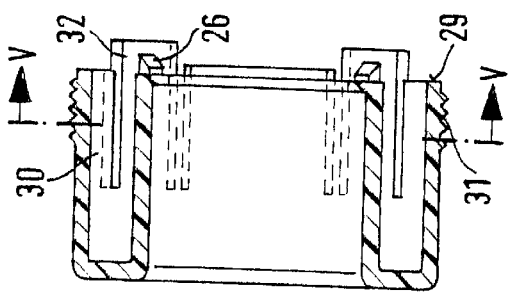

RELEASABLE PLUG COUPLING WITH PROTECTIVE SLEEVE

RELATED APPLICATION

This application claims priority of German Patent Application No. 101 26 205.1 filed May 30, 2001.

SUMMARY OF THE INVENTION

The invention pertains to a releasable plug coupling with a protective sleeve for connecting fluid lines. Such plug couplings are used, e.g., in motor vehicle construction, to connect fuel lines to each other or to a fuel tank or fuel injector.

The plug coupling consists of a coupling housing with a cylindrical receiving space and a separate retaining element with elastic retaining edges that project radially into the receiving space for gripping behind the retaining lip after the insertion of the plug-in part into the receiving space.

The retaining edges are attached to support bodies that project into corresponding recesses in the housing wall when the retaining element is installed. By means of elastic connecting pieces that form a V, the support bodies are connected at their ends to pressure plates that extend outwards through corresponding openings in the housing wall and that can be pressed from the outside for releasing the coupling. In addition, the coupling housing includes a protective sleeve that can be moved against a spring force over the pressure plates of the retaining element.

A similar plug coupling with a protective sleeve is known, e.g., from EP 0 660 022 B1. Therein, the protective sleeve is configured as a cap that is integrally connected by two helical, bent elastic connecting pieces to a support ring that locks in an annular groove on the rear end of the housing. The protective cap is pushed over the housing wall by the force of the elastic connecting pieces such that the pressure plates are covered. This method effectively prevents an unintentional release of the coupling. To release the coupling, the caps must be pushed back until the pressure plates are visible and can be pressed together from the outside by the thumb and index finger. In this way, the retaining edges are moved away from each other and the retaining lip of the plug-in part is released so that the plug-in part can be pulled out.

The '022 plug coupling has proven to have disadvantages wherein the individual parts are pressed against each other during packing and the protective caps can be pressed together with the plastic springs over a long time causing the springs to lose their spring force even before use. Also, the user cannot determine whether the plug-in part is engaged in the coupling housing without additional tools. Therefore, he must also pull on the plug-in part in order to guarantee that the retaining lip is also locked at the retaining edges.

The task of the present invention is to structure the plug coupling described above to prevent the risk of spring fatigue resulting from unfavorable storage and also to guarantee that the plug-in part is engaged correctly in the retaining element by means of a visual indication. This task is solved by the configuration of the protective sleeve described above, as well as by its connection to the coupling housing and the flexibility provided by a spiral spring. The use of a spiral spring made out of metal guarantees a long service life without the appearance of fatigue.

Here, before the plug-in part is inserted, the protective sleeve is located in front of the coupling housing such that the pressure plates of the retaining element can be seen easily. By inserting the plug-in part, the protective sleeve is pushed against the spring force over the head of the coupling housing until the pressure plates are completely covered. This is also a visual indication for the correct connection.

In order to release the plug connection when necessary, sleeve-wall sections having the width of the pressure plates have cuts at the edge of the protective sleeve between two locking tabs and these wall sections overlap the pressure plates when the plug-in part is inserted and can be pressed elastically against the pressure plates. The insertion can be made easier by cross grooves in the outer wall of the sleeve-wall sections.

To permit the locking tabs to be inserted into the grooves easily over the front edge while the protective sleeve is pressed onto the coupling housing, additional wall strips are cut from the edge of the protective sleeve on both sides of the locking tabs which make the locking tabs bend easier when the protective sleeve is pressed onto the coupling housing.

BRIEF DESCRIPTION OF THE DRAWINGS

The plug coupling according to the invention is now explained in more detail with reference to an embodiment illustrated in the drawing. Shown are:

FIG. 1, a longitudinal section of the coupling housing with installed retaining element and protective sleeve, FIG. 2, a cross section rotated by 90° through the head of the coupling housing along line II—II in FIG. 1, FIG. 3, a longitudinal section of the protective sleeve as shown in FIG. 1, FIG. 4, a longitudinal section of the protective sleeve viewed along line IV—IV in FIG. 3, FIG. 5, a cross section of the protective sleeve viewed along line V—V in FIG. 4, FIG. 6, a longitudinal section of the coupling housing with installed protective sleeve as shown in FIG. 1, however it is turned by 90° for insertion of the plug-in part, FIG. 7, the same representation of the coupling housing as shown in FIG. 6 with a completely inserted plug-in part, FIG. 8, the same representation of the coupling housing as shown in FIG. 6, however but it is an external view before the insertion of the plug-in part, and FIG. 9, the same representation of the coupling housing shown in FIG. 8 with a completely inserted plug-in part.

DETAILED DESCRIPTION OF THE PREFERRED EMBODIMENT

Figure 6:
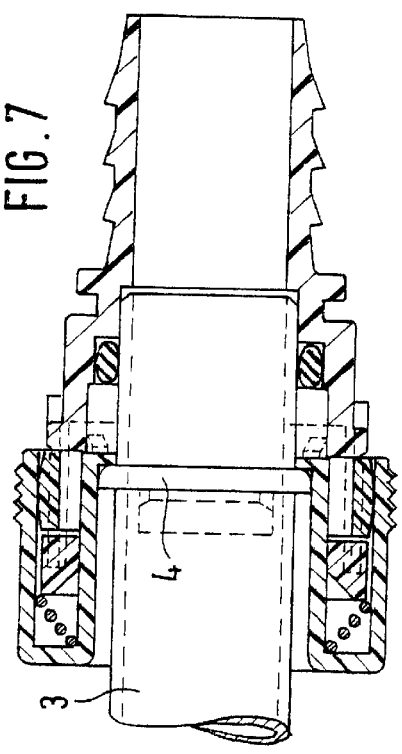
Figure 7:
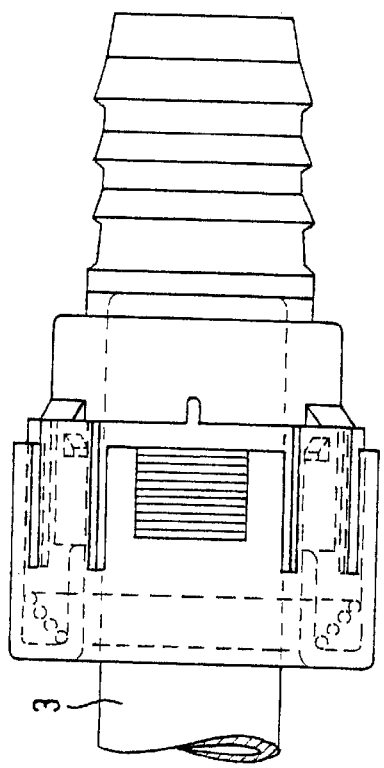

The plug coupling illustrated in the figures essentially consists of a coupling housing 1 with a cylindrical receiving space 2 for insertion of a plug-in part 3 that has an annular retaining lip 4 at a distance from the port end 5 (cf. FIG. 6). In the inlet region, the coupling housing 1 has an enlarged housing head 6 that receives a separate retaining element 7.

At the end of the receiving space 2, the coupling housing 1 includes a so-called pipe union 8 that is used to connect a not illustrated fluid line. At its other end, the plug-in part 3 can also have a similarly configured pipe union for connecting to the end of another fluid line. However, it can also be directly attached to a fuel tank or fuel injector.

With reference to FIG. 1, a sealing ring 9 made out of rubber is embedded in the middle, recessed section of the receiving space 2 and it is restrained from the inlet region by a support ring 10. The retaining element 7 has elastic retaining edges 11 that project radially into the receiving space 2 and that are pressed towards each other when the plug-in part 3 is inserted into the receiving space 2 by the retaining lip 4 and after passing the retaining edges 11, they spring back into their original position and in this way, the retaining lip 4 is locked in a known way for coupling the plug-in part 3.

For this purpose, the retaining edges 11 are attached to two support bodies 12 that project outwards, that extend into corresponding recesses 13 of the housing wall 17 when the retaining element 7 is installed, and that are held there against the insertion direction. The support bodies 12 are connected at their ends by means of elastic connecting pieces 14 (FIG. 2) that form a V, wherein the connecting points are covered by rectangular pressure plates 15 that project outwards through openings 16 in the housing wall 17. For releasing the coupling, the pressure plates 15 are pressed together from the outside. In this way, the retaining edges 11 are moved from each other by the elastic connecting pieces 14 and the support bodies 12, so that the retaining lip 4 is released and the plug-in part 3 can be pushed out from the coupling housing 1.

Figure 9:
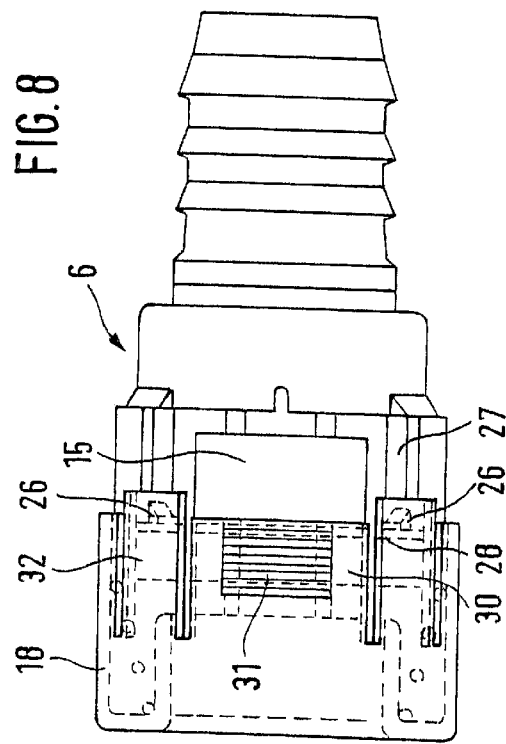

In order to prevent unintentional release of the coupling, there is a protective sleeve 18 that is illustrated in the FIGS. 3 and 6 that can shift axially on the head 6 of the coupling housing 1 such that the pressure plates 15 are covered when the plug-in part 3 is pressed into the receiving space 2 of the protective sleeve 18 (cf. FIG. 9).

Figure 8:
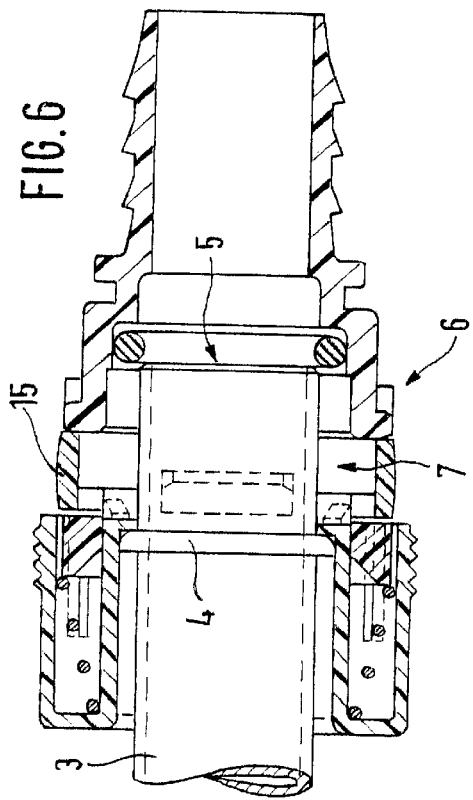

This protective sleeve 18 is integrally connected by an axial connection ring 19 to an inner sleeve 20, whose inner diameter is slightly larger than the outer diameter of the retaining lip 4. The inner edge 21 of the inner sleeve 20 is connected by two connecting pieces 22 to a ring 23, whose inner diameter corresponds to the pipe diameter of the plug-in part 3 and whose outer diameter corresponds to the outer diameter of the retaining lip 4. The connection ring 19 of the protective sleeve 18 is supported by a spiral spring 24 (FIG. 1) made out of metal at the front wall 25 of the housing head 6. In addition, at the inner wall 21 of the protective sleeve 18, there are pairs of opposing, inwardly projecting locking tabs 26 that are angled against the insertion direction. These locking tabs 26 are guided so that they shift at the outer wall 17 of the housing head 6 into axis parallel grooves 27 which end shortly before the front wall 25 with a stop 28 (cf. FIG. 8).

The assembly of the protective sleeve 18 and the coupling housing 1 is done such that the spiral spring 24 is first inserted over the inner sleeve 20 up to the connection ring 19. Then, the protective sleeve 18 is pressed in the direction of the arrow "M" (FIG. 3) onto the housing head 6 until the locking tabs 26 snap into place after the initial bending in the grooves 27. The spiral spring 24 then exerts a small force between the connection ring 19 and the front wall 25 of the housing head 6, wherein the protective sleeve 18 is held in place by the stop 28 shortly in front of the front wall 25 on the housing head 6 in a state ready for operation.

From the edge 29 of the protective sleeve 18, wall sections 30 of the width of the pressure plates 15 have cuts between every two locking tabs 26 and these wall sections cover the pressure plates 15 when the plug-in part 3 is inserted. As best illustrated in FIGS. 4 and 6, these wall sections 30 feature cross grooves 31 at the outer side, which make the wall sections 30 bend more easily against the pressure plates 15 when the retaining element 7 is released. Additional wall strips 32 are cut on both sides of the locking tabs 26 and these strips make the locking tabs 26 bend more easily when the protective sleeve 18 is pressed onto the housing head 6. The connecting pieces 22 between the inner sleeve 20 and the ring 23 are long enough that the ring 23 of the retaining lip 4 is moved far enough into the receiving space 2 that the wall sections 30 completely cover the pressure plates 15 for locking with the retaining edges 11 (FIG. 9).

What is claimed is:

1. Releasable plug coupling for connecting fluid lines comprising a tubular plug-in part (3) with an annular retaining lip (4), a coupling housing (1) with a cylindrical receiving space (2), and a separate retaining element (7) with elastic retaining edges (11) that project radially into the receiving space (2) for gripping behind the retaining lip (4) after the plug-in part (3) is inserted into the receiving space (2), wherein the retaining edges (11) are attached to support bodies (12) that extend into corresponding recesses (13) in the housing wall (17) when the retaining element (7) is installed, and wherein the support bodies (12) are connected at their ends by elastic connecting pieces (14) that form a V to pressure plates (15) that extend outwards through corresponding openings (16) in the housing wall (17) and that can be pressed from the outside for releasing the coupling, as well as a protective sleeve (18) that can be moved against a spring force over the pressure plates (15) of the retaining element (7), characterized in that the protective sleeve (18) is integrally connected by a radial connection ring (49) to an inner sleeve (20), whose inner diameter is slightly larger than the outer diameter of the retaining lip (4) and whose inner edge (21) is connected by two connecting pieces (22) to a ring (23), whose inner diameter corresponds to the pipe diameter of the plug-in part (3) and whose outer diameter corresponds to the outer diameter of the retaining lip (4), wherein the connection ring (19) of the protective sleeve (18) is supported by a spiral spring (24) at the front wall (25) of the housing head (6) and the inner wall (21) of the protective sleeve (18) has pairs of opposing, inwardly projecting locking tabs (26) that are angled against the insertion direction and that are guided in axis parallel grooves (27) in the outer wall (17) of the housing head (6), wherein the grooves (27) end shortly before the front wall (25) with a stop (28).

2. Releasable plug coupling according to claim 1, characterized in that sleeve-wall sections (30) of the width of the pressure plates (15) have cuts from the edge (29) of the protective sleeve (18) between every two locking tabs (26) and the wall sections cover the pressure plates (15) of the retaining elements (7) when the plug-in part (3) is inserted.

3. Releasable plug coupling according to claim 2, characterized in that the sleeve wall sections (30) can be pressed elastically against the pressure plates (15) and they have cross grooves (31) in the outer wall.

4. Releasable plug coupling according to claim 1, characterized in that additional wall strips (32) are cut out on both sides of the locking tabs (26) from the edge (29) of the protective sleeve (18) and these strips enable the locking tabs (26) to bend when the protective sleeve (18) is pressed onto the housing head (6).

5. Releasable plug coupling according to claim 2, characterized in that the connecting pieces (22) are long enough that the ring (23) at the end of the connecting pieces (22) are moved by the retaining lip (4) of the plug-in part (3) far enough into the receiving space (2) that the wall sections (30) completely cover the pressure plates (15) for locking with the retaining edges (11).

6. Releasable plug coupling according to claim 2, characterized in that additional wall strips (32) are cut out on both sides of the locking tabs (26) from the edge (29) of the protective sleeve (18) and these strips enable the locking tabs (26) to bend when the protective sleeve (18) is pressed onto the housing head (6).

7. Releasable plug coupling according to claim 3, characterized in that the connecting pieces (22) are long enough that the ring (23) at the end of the connecting pieces (22) are moved by the retaining lip (4) of the plug-in part (3) far enough into the receiving space (2) that the wall sections (30) completely cover the pressure plates (15) for locking with the retaining edges (11).

8. A releasable plug coupling comprising:
   a coupling housing having a cylindrical receiving space and a housing wall;
   a detachable retaining element that couples to said housing, said retaining element comprising:
      elastic retaining edges that project radially into said receiving space for retaining a tubular plug-in part therein;
      at least two pressure plates formed integral to said retaining edges that extend outwards through openings in said housing wall, said pressure plates being operative to cause the retaining edges to release said plug-in part when compressed; and
   a detachable, spring loaded protective sleeve that attaches to said coupling housing such that said sleeve covers said pressure plates when the plug-in part is inserted into the receiving space, said protective sleeve including bendable wall sections that cover the pressure plates such that compressing said wall sections causes the pressure plates to release said plug-in part.

9. The releasable plug coupling according to claim 8 wherein the bendable wall sections include cross grooves that allow the wall sections to elastically bend against the pressure plates.

* * * * *

UNITED STATES PATENT AND TRADEMARK OFFICE
CERTIFICATE OF CORRECTION

PATENT NO. : 6,557,899 B2  
DATED : May 6, 2003  
INVENTOR(S) : Martin-Cocher et al.

It is certified that error appears in the above-identified patent and that said Letters Patent is hereby corrected as shown below:

<u>Column 4,</u>  
Line 27, replace "49" with -- 19 --.

Signed and Sealed this

Seventh Day of October, 2003

JAMES E. ROGAN  
*Director of the United States Patent and Trademark Office*